United States Patent
Korenev et al.

(10) Patent No.: US 6,998,063 B2
(45) Date of Patent: Feb. 14, 2006

(54) METHOD OF FORMING MICROPOROUS MEMBRANES

(75) Inventors: Sergey Alexandrovich Korenev, Mundelein, IL (US); Ivan Sergeevich Korenev, Mundelein, IL (US)

(73) Assignee: STERIS Inc., Temecula, CA (US)

( * ) Notice: Subject to any disclaimer, the term of this patent is extended or adjusted under 35 U.S.C. 154(b) by 132 days.

(21) Appl. No.: 10/633,201

(22) Filed: Jul. 29, 2003

(65) Prior Publication Data

US 2005/0023245 A1 Feb. 3, 2005

(51) Int. Cl.
| | |
|---|---|
| B44C 1/22 | (2006.01) |
| C03C 15/00 | (2006.01) |
| C03C 25/68 | (2006.01) |
| C23F 1/00 | (2006.01) |
| B31D 3/00 | (2006.01) |

(52) U.S. Cl. .......................................... 216/87; 216/56
(58) Field of Classification Search ................. 216/87, 216/62, 56; 264/405, 413, 424, 425
See application file for complete search history.

(56) References Cited

U.S. PATENT DOCUMENTS

| | | | |
|---|---|---|---|
| 3,713,921 A | 1/1973 | Fleischer et al. ............... 156/2 |
| 3,770,532 A | 11/1973 | Bean et al. ..................... 156/7 |
| 3,802,972 A | 4/1974 | Fleischer et al. ............... 156/7 |
| 4,196,070 A | 4/1980 | Chao et al. ................... 204/266 |
| 4,764,485 A | 8/1988 | Loughran et al. ........... 437/225 |
| 4,832,997 A | 5/1989 | Balanzat et al. ............ 428/131 |
| 4,956,219 A * | 9/1990 | Legras et al. ................ 343/771 |
| 5,066,565 A * | 11/1991 | Martinez et al. ............ 430/296 |
| 5,234,538 A | 8/1993 | Luck .......................... 156/644 |
| 5,555,549 A | 9/1996 | Nakaishi |
| 5,914,150 A | 6/1999 | Porter et al. .................. 427/77 |
| 6,120,875 A | 9/2000 | Haumont et al. ........... 428/131 |
| 6,258,271 B1 | 7/2001 | Jitariouk et al. ........ 210/500.23 |
| 6,327,339 B1 | 12/2001 | Chung et al. ................ 378/121 |
| 6,340,718 B1 | 1/2002 | Korenev et al. ............ 522/156 |
| 6,565,764 B1 * | 5/2003 | Hiraoka et al. ............... 216/56 |

OTHER PUBLICATIONS

Dale W. Schaefer, MRS Bulletin, article: "Engineered Porous Materials," Apr. 1994, pp. 14-17.
Osmonics, Inc., article entitled: "Basic Principles of Microfiltration," p. 322 (5 pages), from website www.osmo.com/products/page322htm dated Aug. 19, 2002.
Reimar Spohr, article entitled: "Ion Track Technolgy: From Responsive to Flipping Membranes;" outline of Consultant's Meeting in Takasaki, Japan, May 17-20, 1999; 7 pages taken from website www-wnt.gsi.de/mr/iaea%201999%20report.htm, dated Aug. 19, 2002.
Robert L. Fleischer, American Scientist-The Magazine of Sigma XI, the Scientific Research Society (vol. 90), article entitled: "Serendipitous Radiation Monitors," Jul.-Aug. 2002, pp. 324-331.
Robert L. Fleischer, MRS Bulletin, article entitled: "Technical Applications of Ion Tracks in Insulators," Dec. 1995, pp. 35-41.

* cited by examiner

Primary Examiner—Parviz Hassanzadeh
Assistant Examiner—Roberts Culbert
(74) Attorney, Agent, or Firm—Kusner & Jaffe; Michael A. Centanni

(57) ABSTRACT

A method of forming a microporous fluoropolymer membrane, comprising the steps of:

irradiating a sheet of fluoropolymer at a dosage level below the rupture energy of the carbon-to-fluorine (C—F) bonds of the fluoropolymer, but sufficient to rupture carbon-to-carbon (C—C) bonds; and exposing the sheet of fluoropolymer to an etchant for a period of time sufficient to etch away disrupted atoms and molecules, wherein continuous micropassages are formed through the sheet.

19 Claims, 10 Drawing Sheets

METHOD OF FORMING MICROPOROUS MEMBRANES

FIELD OF THE INVENTION

The present invention relates to the production of microporous membranes, and more particularly, to a process for forming microporous membranes from fluoropolymers.

BACKGROUND OF THE INVENTION

Microporous membranes find advantageous application in the filtration field. Such membranes can be produced with particles that produce chains of defects in the membrane, which defects correspond to the path of the particles. These defects make the areas around them sensitive to certain chemical agents. Exposure of the membrane to such chemical agents makes it possible to produce pores along the path of the particles, and thus the filtration characteristics of the microporous membrane.

It has been known to produce porous membranes from materials, such as polyethylene terephthalate (PET), polypropylene (PP) and polycarbonates. The paths or defects in the polymers are typically formed by irradiating the polymers with heavy ions, such as krypton (Kr), xenon (Xe), argon (Ar) and uranium (U). Irradiating polymers with such heavy ions requires relatively high energy level particle accelerators, such as high-energy cyclotrons. Following irradiation, the polymers are etched to form the pores.

One problem associated with the conventional methods of producing pore membranes is that the thickness of the materials used is limited due to the limited depth of penetration of the aforementioned heavy ions. For example, the maximum thickness of the foregoing materials that could be used when irradiated with xenon, argon and krypton is approximately 10 microns.

Another problem with the conventional methods of producing pore membranes is that they do not lend themselves to forming pore membranes from fluoropolymers, such as polytetrafluoroethylene (PTFE). In this respect, chemical and physical problems exist with trying to form nuclear pores in fluoropolymers, such as polytetrafluoroethylene (PTFE).

A third problem associated with the conventional methods of producing pore membranes is the cost of such processes. Cyclotrons, typically required to produce heavy ions with the requisite high kinetic energy to produce nuclear pores, are extremely expensive.

The present invention overcomes these and other problems, and provides a method of forming microporous membranes from fluoropolymers, such as polytetrafluoroethylene (PTFE).

SUMMARY OF THE INVENTION

In accordance with a preferred embodiment of the present invention, there is provided a method of forming a microporous fluoropolymer membrane, comprising the steps of: irradiating a sheet of fluoropolymer with electrons at a dosage level below the rupture energy of the carbon-to-fluorine (C—F) bonds of the fluoropolymer, but sufficient to rupture carbon-to-carbon (C—C) bonds; and exposing the sheet of fluoropolymer to an etchant for a period of time sufficient to etch away disrupted molecules and atoms, wherein continuous micropassages are formed through the sheet.

In accordance with another aspect of the present invention, there is provided a method of forming a microporous fluoropolymer, comprising the steps of:
  irradiating a fluoropolymer material at a dosage level below the rupture energy of the carbon-to-fluorine (C—F) bonds of the fluoropolymer material, but sufficient to rupture carbon-to-carbon (C—C) bonds;
  exposing the fluoropolymer material to an etchant for a period of time sufficient to etch away disrupted atoms and molecules within the fluoropolymer material; and
  removing the fluoropolymer material from the etchant when continuous micro-passages are formed through the fluoropolymer material.

In accordance with another aspect of the present invention, there is provided a method of forming a microporous polymeric material from an organic polymer, comprising the steps of:
  irradiating an organic polymeric material at a dosage level sufficient to rupture carbon-to-carbon (C—C) bonds, but below the rupture energy of a carbon-to-"x" bond that has a rupture energy greater than a carbon-to-carbon (C—C) bond, where "x" is at least one elemental material that forms a bond with carbon;
  exposing the polymeric material to an etchant for a period of time to etch away disrupted atoms and molecules in the polymeric materials; and
  terminating exposure to the etchant when continuous micro-passages are formed through the polymeric material.

An advantage of the present invention is a method of forming microporous membranes that is less costly than processes known heretofore.

Another advantage of the present invention is a process of forming a microporous membrane from fluoropolymers.

Another advantage of the present invention is a process of forming a microporous membrane from polytetrafluoroethylene (PTFE).

A still further advantage of the present invention is a process of forming microporous membranes of increased thickness.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
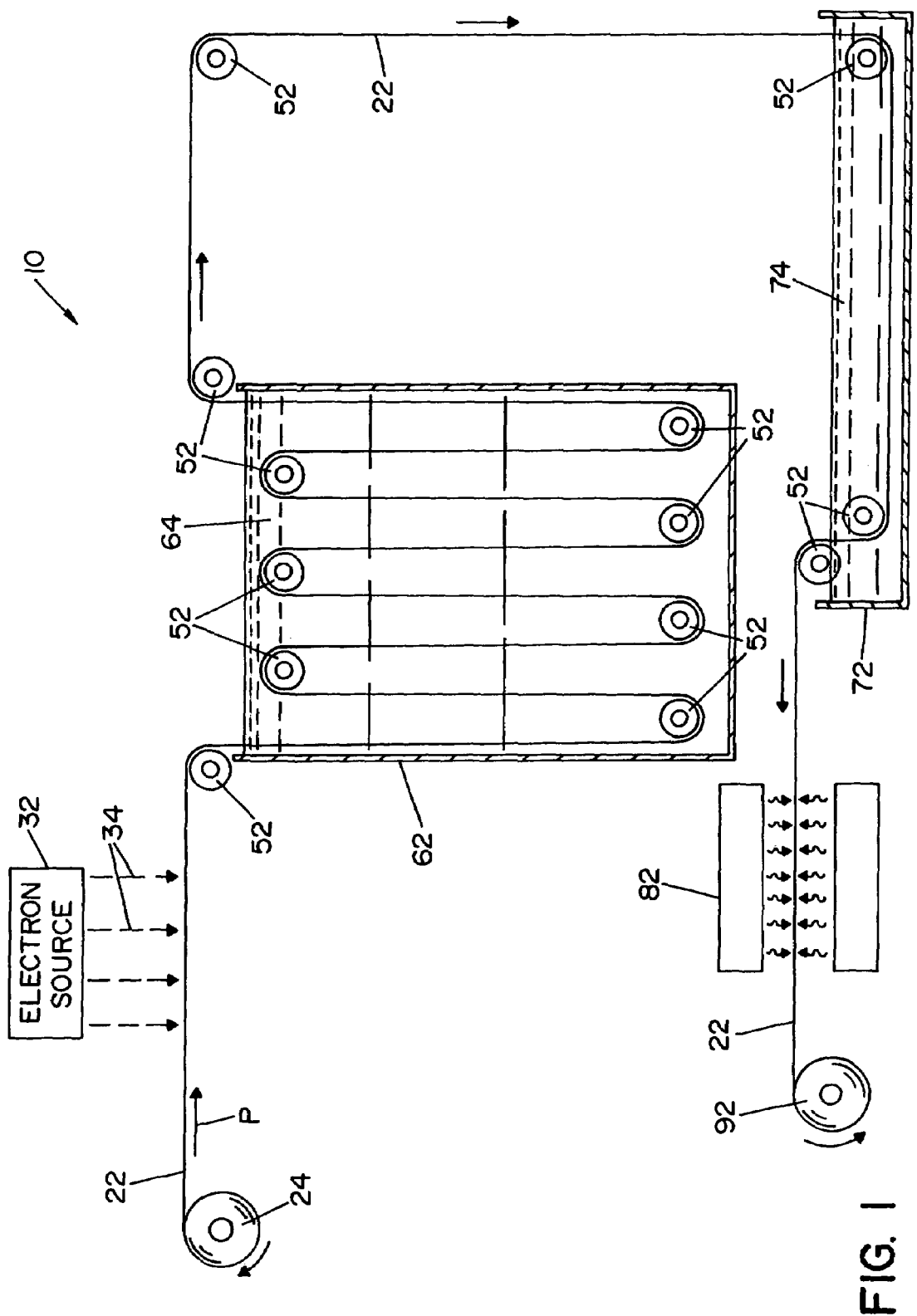
FIG. 1 is a schematic view of a process for forming microporous polymers, illustrating a preferred embodiment of the present invention.

Referring now to the drawings wherein the showings are for the purpose of illustrating preferred embodiments of the invention only, and not for the purpose of limiting same, FIG. 1 shows a process line 10 for forming a microporous polymeric material. The process is particularly applicable to forming a microporous fluoropolymer membrane of a material such as, by way of example and not limitation, polytetrafluoroethylene (PTFE), and will be described with particular reference thereto. However, it is contemplated that microporous membranes of other types of polymeric material may be formed according to the process to be hereinafter described. As used herein, the term "sheet" shall include material, such as film or membranes. It is also contemplated that the present invention is applicable in forming pores in materials having a thickness and stiffness, wherein the material may be referred to as a plate.

Broadly stated, a method of forming a microporous polymeric sheet, according to the present invention, is comprised of a two-step process. The first step comprises irradiating a polymeric sheet with a low dosage of electrons to create defects within the polymeric sheet, the defects being formed along the path, i.e., trajectories, of the electrons through the sheet. The second step is to expose the irradiated polymeric sheet to an etchant to etch the disrupted atoms and molecules in the sheet to form microporous passages through the sheet.

In the embodiment shown, a generally continuous polymeric film 22 is illustrated. Film 22 may have a thickness between 10 μm (microns) and 200 μm (microns). As will be appreciated from a further reading of the specification, the present invention finds advantageous application in forming microporous polymeric sheets having thicknesses above 200 μm, i.e., up to about 30 millimeters (mm). Polymeric sheets of such thickness are generally not referred to as "films," and are generally not flexible enough to be feed from a roller in a continuous fashion as illustrated in FIG. 1. Such thicker sheets may be processed as individual pieces by performing the processing steps hereinafter described, without deviating from the present invention.

Referring again to FIG. 1, the present invention shall be described with reference to a method of forming a microporous membrane from a fluoropolymer film 22. Film 22 is fed from a roll 24 to move along a path P past a radiation source 32 that irradiate fluoropolymer film 22 with electrons or photons 34. Radiation source 32 may be comprised of an electron accelerator, or an x-ray source and an associated target wherein the target releases electrons when x-rays impinge on the target, or an isotope source that releases beta particles, i.e., electrons. Isotope sources, such as cesium (Cs) or cobalt (Co), may be used as a source of photons.

In a preferred embodiment of the present invention, radiation source 32 is an electron accelerator. By way of example and not limitation, a Rhodotron accelerator (not shown) finds advantageous application in producing an electron beam. The electron beam is preferably pulsed. Pulsing the electron beam provides alternate irradiation and cooling periods for the treated sheets. Preferably, the electron beam is scanned back and forth across the surface of the sheet. The scanning provides intermittent irradiation or alternate irradiation and cooling periods. Typical e-beam kinetic energies range from 0.5 MeV to 10 MeV with a pulsed beam current of 1 kA to 50 kA and a pulse duration of 10 nanoseconds to 1,000 nanoseconds. All industrial accelerators (DC, CW, RF linacs) may be used as the source of electrons. The main parameters of a suitable accelerator are: kinetic energy of electrons 0.5–10 MeV and power of beam 10–500 KW.

As indicated above, fluoropolymer film 22 is irradiated by electrons (or photons) that are schematically illustrated and designated 34 in the drawings, to form disruptions or defects within the fluoropolymer material. The disruptions within the fluoropolymer material occur along the path or trajectories of the electrons as the electrons move therethrough. As will be appreciated by those skilled in the art, the movement of the electrons through the fluoropolymer material is influenced by the electronic structure of the atoms or molecules of the fluoropolymer material(s) forming film 22. A secondary effect also occurs as some electrons from the atoms or molecules of the fluoropolymer material are scattered by electrons 34 from source 32.

Figure 2:
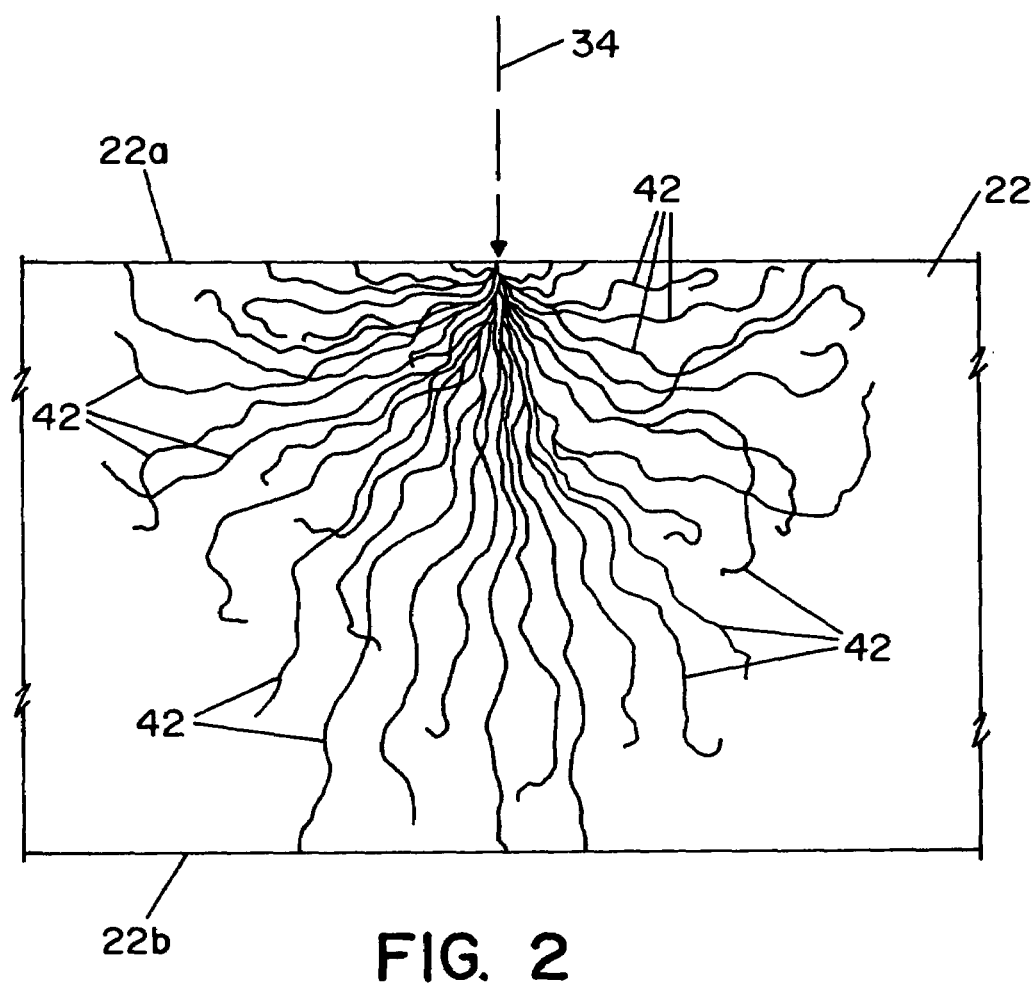
FIG. 2 is a schematic view representing the trajectories of electrons from an electron beam in a polymeric sheet.

FIG. 2 is a schematic representation of the trajectories or paths 42 of electrons 34 from electron source 32 hitting a stationary fluoropolymer film 22, and from the secondary scattering of electrons within film 22. As depicted in the drawing, electrons 34 will scatter along different paths or trajectories 42 as a result of the influence of the electronic structure of the atoms and/or molecules of fluoropolymer film 22 on the electrons. As shown in FIG. 2, some of the electrons scatter longitudinally through film 22, others deflect back towards the upper surface of film 22, and still others form paths that extend through fluoropolymer film 22 from the upper surface 22a to the lower surface 22b.

Figure 5:
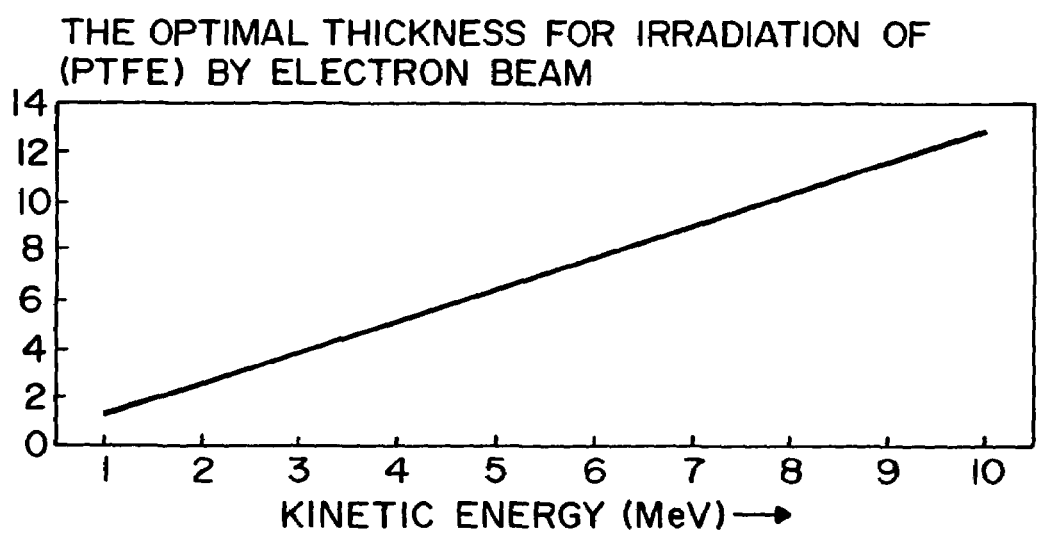
FIG. 5 is a graph showing the optimal thickness of polytetrafluoroethylene (PTFE) for irradiation by an electron beam.

The depth of penetration of electrons 34 into fluoropolymer film 22 is based upon the kinetic energy of electrons 34. FIG. 5 is a chart showing the relationship between the thickness of a fluoropolymer sheet, namely polytetrafluoroethylene (PTFE), and the optimum kinetic energy of the electrons for penetration therethrough.

In accordance with the present invention, the entire surface of fluoropolymer film 22 is exposed to the electron source. The exposure could result from an electron source being moved along the surface of a stationary fluoropolymer film 22, or as shall be described in greater detail below, fluoropolymer film 22 may be moved relative to a stationary electron source. As will be appreciated, exposure of the entire surface of fluoropolymer film 22 to an electron source will produce a continuous web of interlocking trajectories or paths 42, as the pattern depicted in FIG. 2 is repeated through the entire fluoropolymer film 22.

In accordance with the present invention, a polymeric material is irradiated to receive a dosage that is sufficient to break, i.e., rupture, carbon-to-carbon bonds within the polymeric material, but not sufficient to rupture stronger bonds between carbon and other elemental materials within the polymeric material.

For example, fluoropolymer film 22 is preferably irradiated with electrons or photons so as to receive an absorbed dosage that is sufficient to break at least some of the carbon-to-carbon (C—C) bonds within the fluoropolymer material, but not so high an amount so as to break the carbon-to-fluorine (C—F) bonds within fluoropolymer film 22.

As indicated above, the present invention is particularly applicable in forming microporous polytetrafluoroethylene (PTFE) membranes. When forming microporous polytetrafluoroethylene (PTFE) membranes, the polytetrafluoroethylene (PTFE) film is preferably exposed to electrons at a dosage level below the rupture energy of the carbon-to-fluorine (C—F) bonds of the polytetrafluoroethylene (PTFE), but above the rupture energy of the carbon-to-carbon (C—C) bonds of the polytetrafluoroethylene (PTFE). A preferred dosage for a polytetrafluoroethylene (PTFE) membrane is 5 kGy to 50 kGy, and more preferably, 5 kGy to 20 kGy. The specific kinetic energy of the electrons is based upon the thickness of the fluoropolymer film or sheet. FIG. 5 shows the optimal energy level for different thicknesses of polytetrafluoroethylene (PTFE). In this respect, fluoropolymer films 22 (sheets) of up to 15 mm may be used in process 10. (As shall be described in greater detail below, a microporous fluoropolymer sheet up to about 30 mm may be formed by irradiating both sides of a fluoropolymer sheet).

The dosage of radiation absorbed by the fluoropolymer sheet is maintained at a low level to prevent degradation of the fluoropolymer material into toxic by-products. In this respect, fluoropolymer materials have long carbon chains with pendant fluorine atoms. Carbon-to-carbon (C—C) bonds are broken by the incident electrons into smaller chains and chain segments including some short $C_2F_4$ chain segments. This process is typically termed "chain scission." In the ionizing environment of the irradiation chamber, some of the short chains degrade into free or reactable carbon and fluorine molecules.

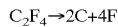
$C_2F_4 \rightarrow 2C+4F$

Analogously, water vapor in environmental air is also ionized:

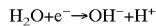
$H_2O+e^- \rightarrow OH^- +H^+$

The free hydrogen and fluorine react to form hydrogen fluoride:

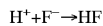
$H^+ +F^- \rightarrow HF$

The remaining carbon and hydroxyl radicals react to form carbon dioxide and hydrogen gas. Analogously, other $C_2F_4$ radicals react directly with oxygen from the air and free hydrogen from ionized water vapor to form $CF_2COOOH+HF$.

Following the irradiation steps, fluoropolymer film 22 is exposed to an etchant to etch away the disrupted fluoropolymer material that is created along trajectories 42 formed by electrons 34. Removal of the disrupted fluoropolymer material within film 22 produces continuous interlocking micropassages through fluoropolymer film 22. Etching of irradiated fluoropolymer film 22 may consist of immersing fluoropolymer film 22 in a liquid etchant, or may consist of exposing the irradiated, fluoropolymer film 22 in a gas etchant.

In the embodiment shown in FIG. 1, fluoropolymer film 22 is immersed in a liquid etchant. As illustrated in FIG. 1, film 22 is guided by a plurality of guide rollers 52 to a tank 62 containing an etching solution 64. Etching solution 64 may be any type of conventionally known etchant suitable for etching the specific types of fluoropolymer material used in process 10. A sodium solution, such as sodium ammonia, or other chemical solutions, such as ethylene glycol dimethyl ether (MONOGLYME), diethylene glycol dimethyl ether (DIGLYME) or tetraethylene glycol dimethyl ether (TETRAGLYME) may find advantageous application in etching fluoropolymers, such as polytetrafluoroethylene (PTFE). In the embodiment shown, guide rollers 52 within the tank 62 maintain fluoropolymer film 22 within etching solution 64 for a predetermined period of time based upon the speed of the moving film 22. In this respect, tank 62 and the path of film 22 within tank 62 are preferably dimensioned such that fluoropolymer film 22 is exposed to e-beam radiation source 32 for a desired period of time, and will be disposed within etching solution 64 for a period of time sufficient to form the desired micropassages through film 22. In this respect, as indicated above, etching solution 64 basically produces micropassages, i.e., continuous, pores along trajectories 42 of electron beams 34, by etching away the disrupted atoms and molecules in fluoropolymer film 22 that are formed by electrons 34.

The exposure time of fluoropolymer film 22 to etching solution 64 determines the amount of fluoropolymer material along trajectories 42 that is etched away. In this respect, the etching time must be controlled to produce the desired pore size. As will be appreciated, the etching time will be based upon a number of factors, such as, by way of example and not limitation, the type of polymer forming film 22, the thickness of film 22, the type of etchant used and the desired resultant pore size.

The etched fluoropolymer film 22 exits tank 62, and is preferably rinsed by a spray or dip process to remove excess etching material. In the embodiment shown, etched film 22 passes through a rinse tank 72 containing water 74 or some other suitable neutralizing solution. The etched film is then dried by a dryer 82 and then rolled up onto a take-up roll 92, as schematically illustrated in FIG. 1.

Figure 7:
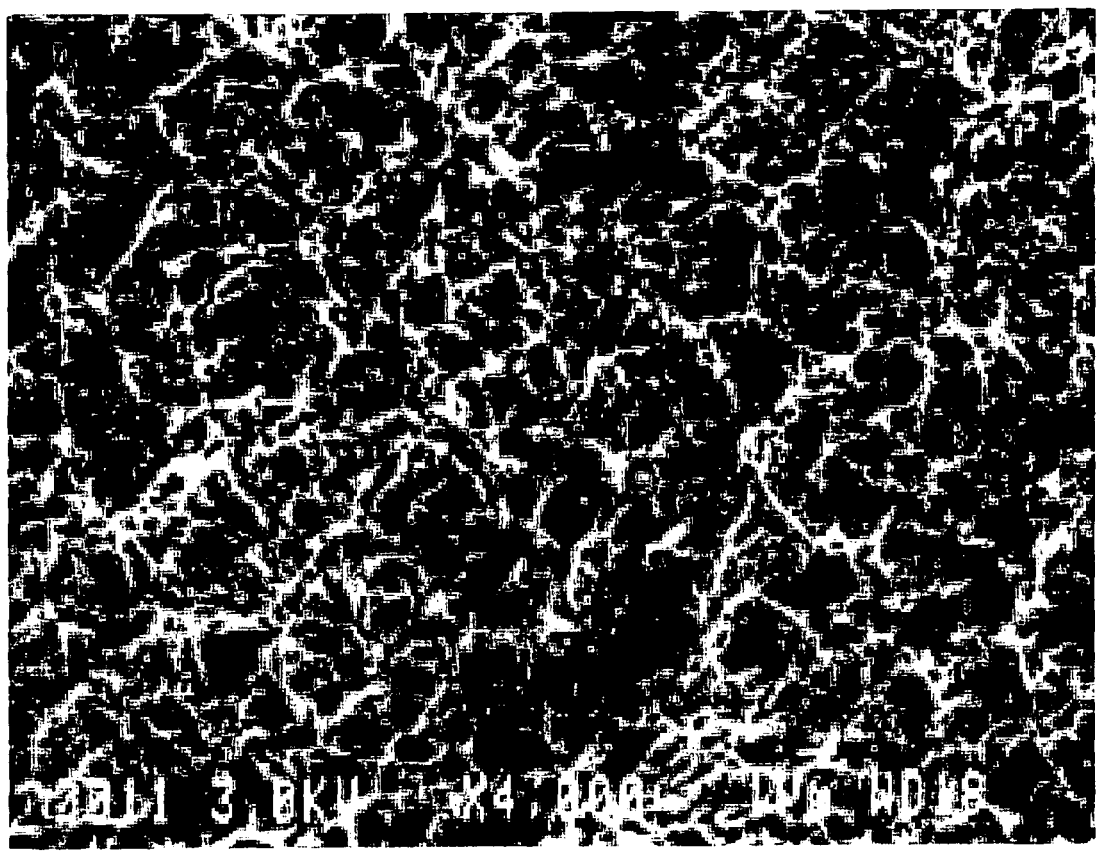
FIG. 7 is a micro-photograph of a microporous polytetrafluoroethylene (PTFE) membrane formed in accordance with the present invention.

FIG. 7 is a micro-photograph of a cross-section of microporous membranes formed according to the present invention.

Figure 3:
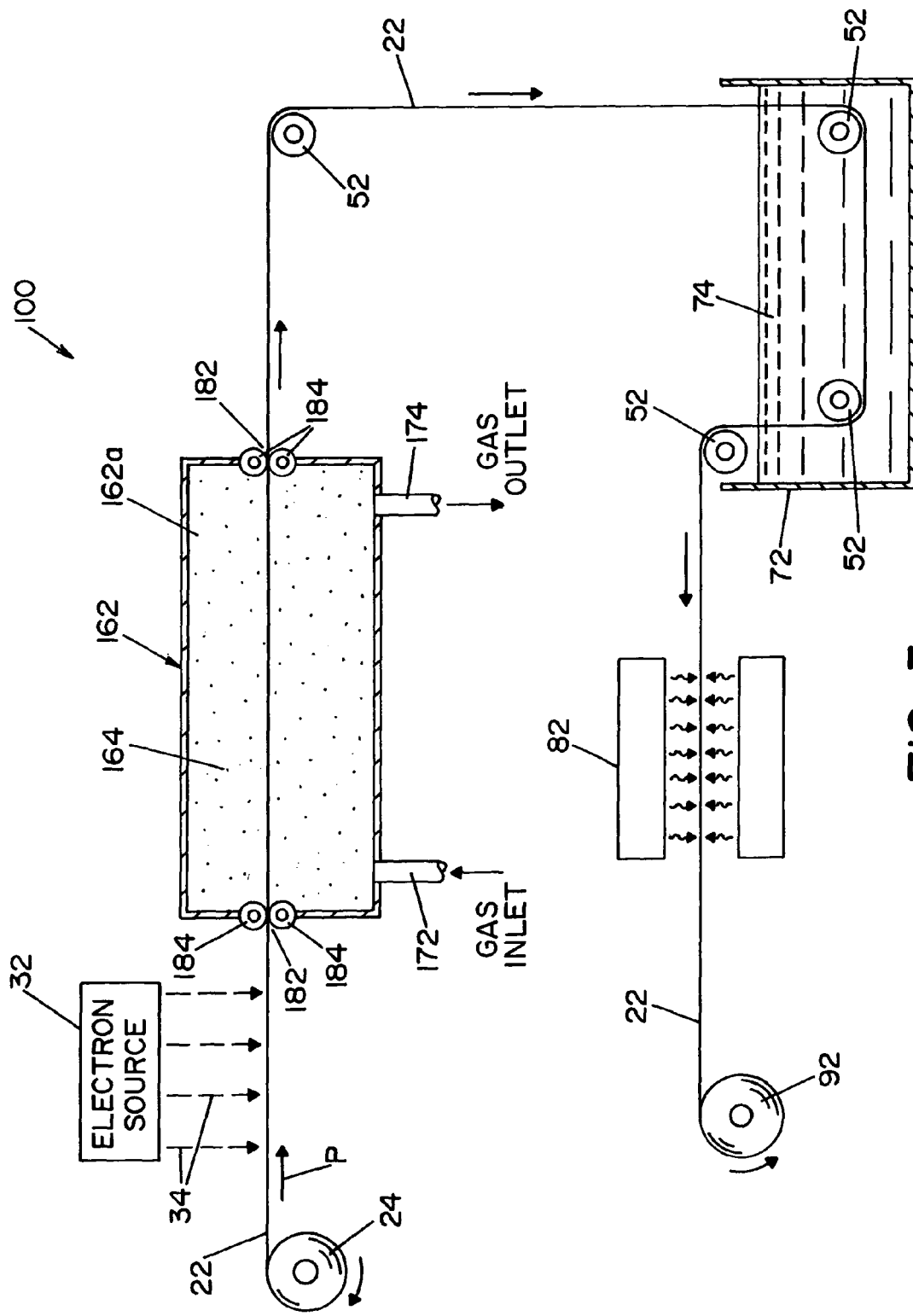
FIG. 3 is a schematic view of a process for forming microporous polymers, illustrating an alternate embodiment of the present invention.

Referring now to FIG. 3, a process line 100 illustrating another embodiment of the present invention is shown. (In FIG. 3, components that are the same as those shown in FIG. 1 are identified with like reference numbers). In FIG. 3, tank 62 containing liquid etching solution 64, as shown in FIG. 1, is replaced with a housing 162 for containing a gas etchant 164. Housing 162 defines an inner chamber 162a. An inlet pipe 172 provides a continuous flow of etchant gas 164 into chamber 162a, and an outlet pipe 174 removes excess gas from etching chamber 162a. In this respect, a gas circulation system (not shown) is preferably provided to circulate etchant gas 164 through inner chamber 162a of housing 162. Housing 162 includes openings 182 in the opposite sides thereof to allow fluoropolymer film 22 to pass therethrough. Openings 182 preferably include some type of sealing means to prevent escape of etchant gas 164 therefrom. In the embodiment shown, rollers 184 are provided at openings 182 in housing 162 to allow fluoropolymer film 22 to move through housing 162, but to prevent etchant gas 164 from escaping therefrom. By way of example and not limitation, fluorine gas finds application in etching polytetrafluoroethylene (PTFE). It is believed that the use of a gas etchant is most effective with thin films or membranes, i.e., when films or membranes having a thickness of 100 µm or less are to be etched (treated).

Figure 4:
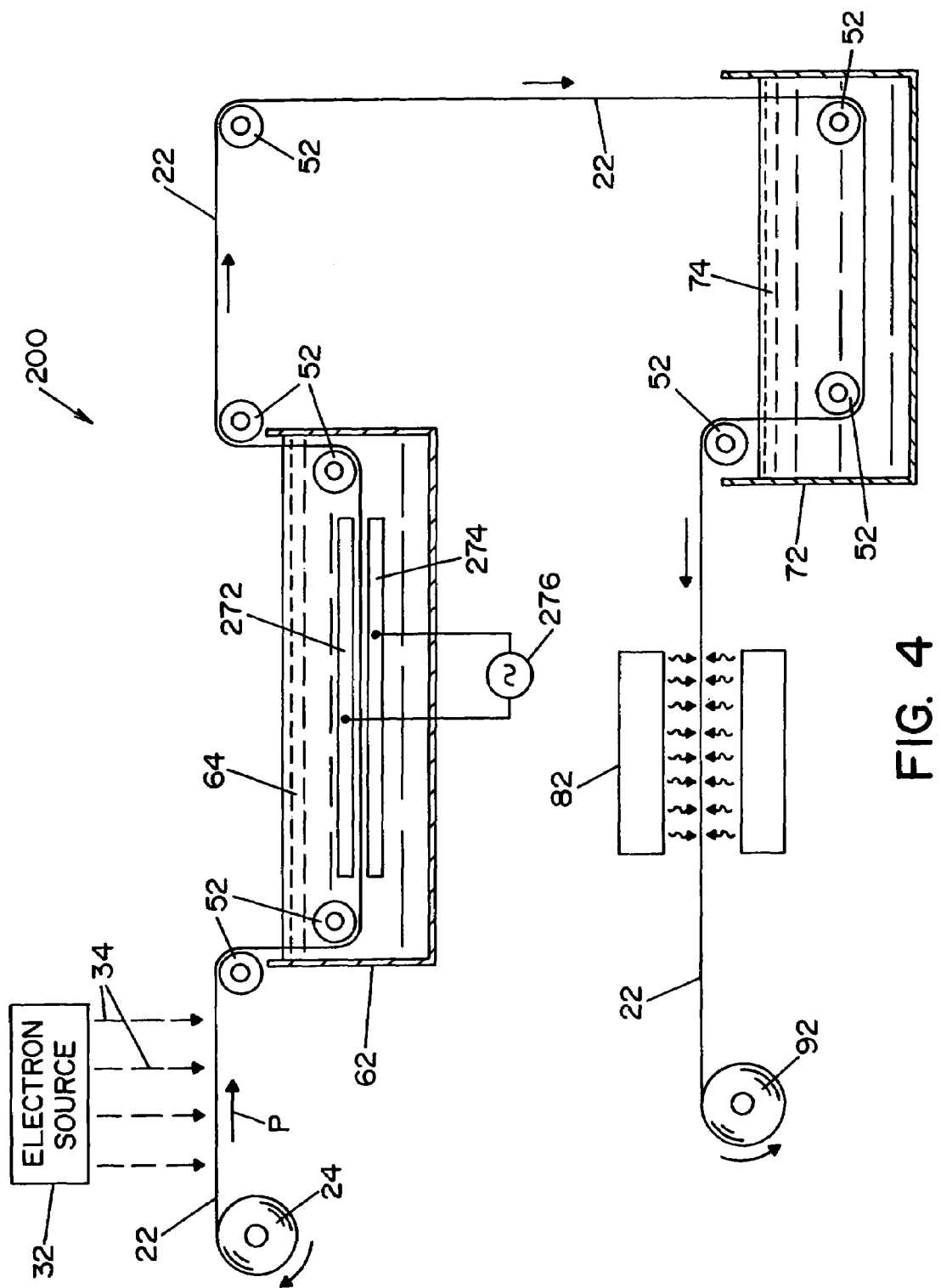
FIG. 4 is a schematic view of a process for forming microporous polymers, illustrating another embodiment of the present invention.

Referring now to FIG. 4, a process line 200, illustrating another embodiment of the present invention, is shown. (In FIG. 4, components that are the same as those shown in FIG. 1 are identified with like reference numbers). In FIG. 4, irradiated, fluoropolymer film 22 is etched in etching solution 64 between two plates 272, 274 that are charged by an external power source 276 in an electrophoretic process. In this respect, irradiated fluoropolymer film 22 is immersed into tank 62 containing etching solution 64. Film 22 passes between charged plates 272, 274 that enhance the etching of film 22 as charged colloidal particles or molecules within etching solution 64 migrate through film 22 under the influence of the applied electric field provided by the immersed electrode plates 272, 274.

In the foregoing embodiments, a proper etching time needs to be maintained to produce a microporous sheet. In this respect, the etching time is related to the thickness of the fluoropolymer material. Because of the web-like defects formed within the fluoropolymer structure as a result of the e-beam bombardment, excessive exposure to an etchant may result in the total deterioration of film 22.

The present invention shall now be further described by way of Examples, wherein a polytetrafluoroethylene (PTFE) film is formed into a porous membrane.

EXAMPLE I

A polytetrafluoroethylene (PTFE) film having a thickness of approximately 100 microns is irradiated in a vacuum (air) to receive an absorbed dose of about 5 kGy. The irradiated film is etched for 10 to 25 minutes in a sodium ammonia etchant. The resultant membrane has pores having average dimensions of between 0.2 and 10 microns.

EXAMPLE II

A polytetrafluoroethylene (PTFE) film having a thickness of approximately 1 mm is irradiated in air to receive an absorbed dose of about 5 kGy. The irradiated film is etched for 30 to 40 minutes in a sodium ammonia etchant. The resultant membrane has pores having average dimensions of between 0.5 and 20 microns.

EXAMPLE III

A polytetrafluoroethylene (PTFE) film having a thickness of approximately 100 microns is irradiated in a vacuum (air) to receive an absorbed dose of about 5 kGy. The irradiated film is etched for 5 to 7 minutes in a sodium ammonia etchant between two electrode plates, i.e., within an electric field, that support a current of 10 mA, DC to produce an electrophoresis effect. The resultant membrane has pores having average dimensions of between 0.2 and 10 microns.

EXAMPLE IV

A polytetrafluoroethylene (PTFE) film having a thickness of approximately 1 mm is irradiated in air to receive an absorbed dose of about 5 kGy. The irradiated film is etched for 12 to 26 minutes in a sodium ammonia etchant between two electrode plates, i.e., within an electric field, that support a current of 10 mA, DC to produce an electrophoresis effect. The resultant membrane has pores having average dimensions of between 0.5 and 20 microns.

Examples III and IV illustrate how etching the polytetrafluoroethylene (PTFE) film between charged electrodes may reduce the etching time of the polymeric material.

As illustrated in FIG. 2, the side of the polytetrafluoroethylene (PTFE) film that is exposed to the e-beam radiation has a denser web of interwoven defects (i.e., trajectories 42). In other words, the side of the polytetrafluoroethylene (PTFE) film facing the e-beam radiation has more interlocking pores and tracks. In this respect, as noted above, depending upon the thickness of the fluoropolymer material, a gradient of pore density exists across the film.

Figure 6:
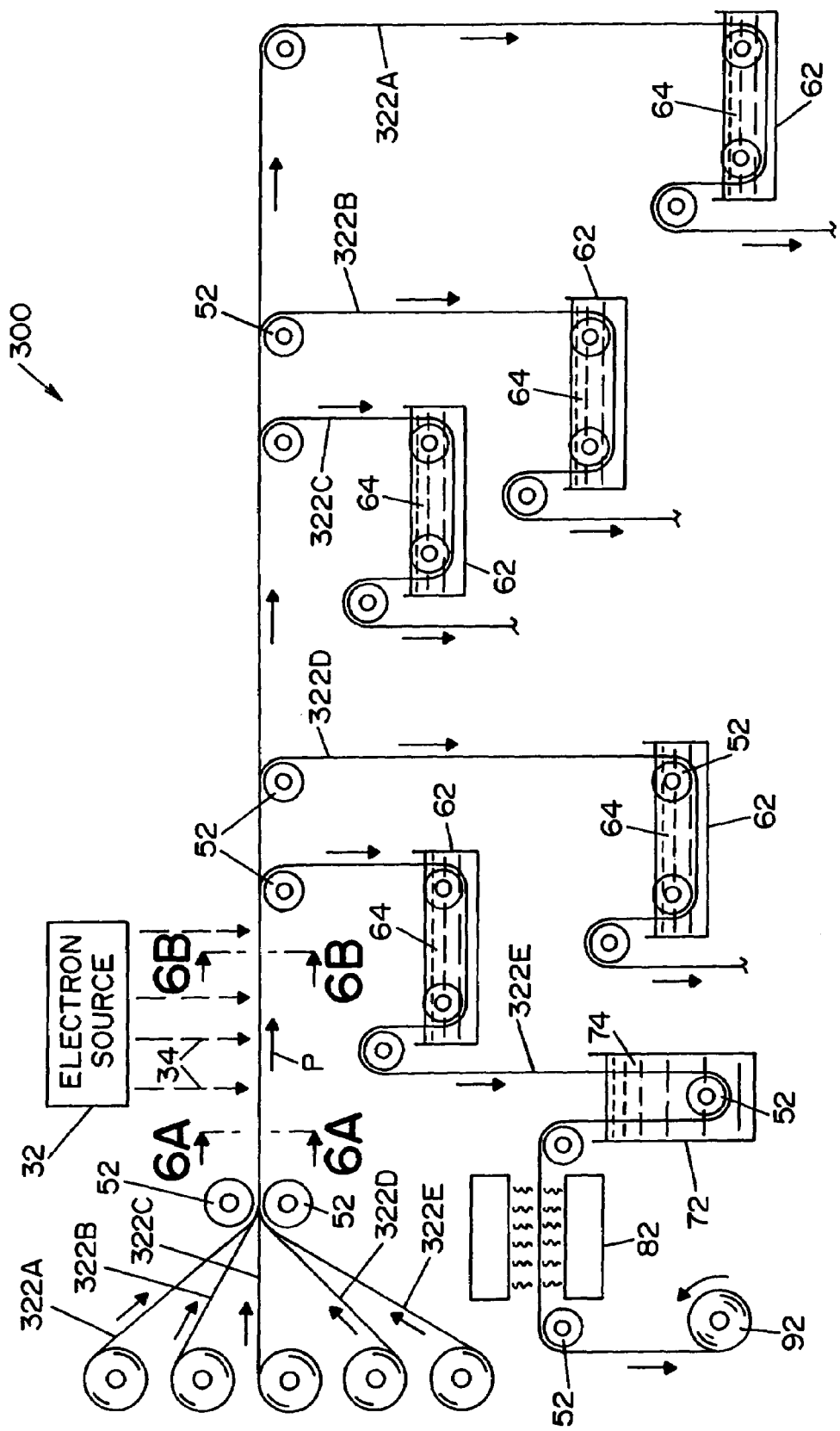
FIG. 6 is a schematic view of a process for simultaneously forming a plurality of microporous polymeric membranes, illustrating another embodiment of the present invention.
Figure 6A:
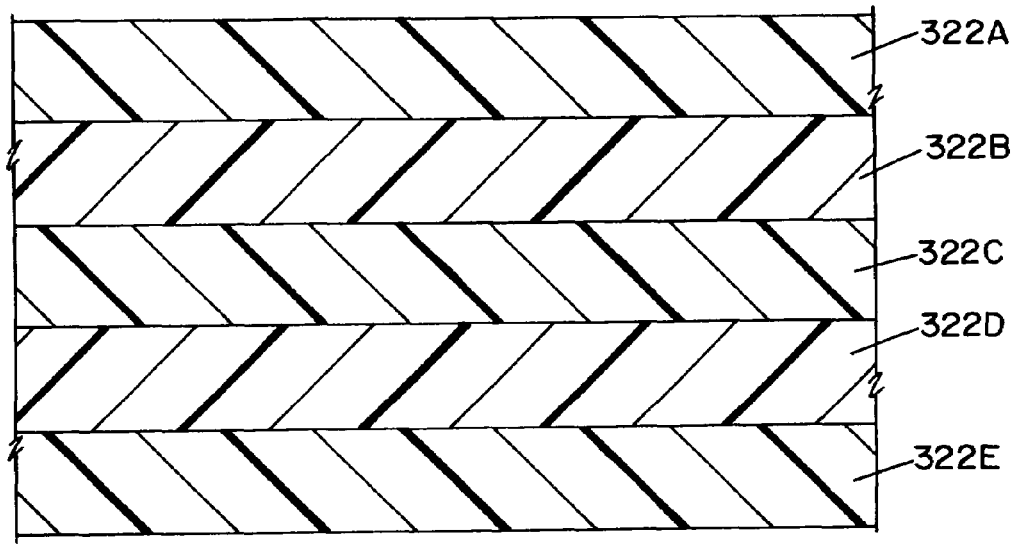
FIG. 6A is a sectional view taken along lines 6A—6A of FIG. 6, showing multiple layers of polymeric sheets.
Figure 6B:
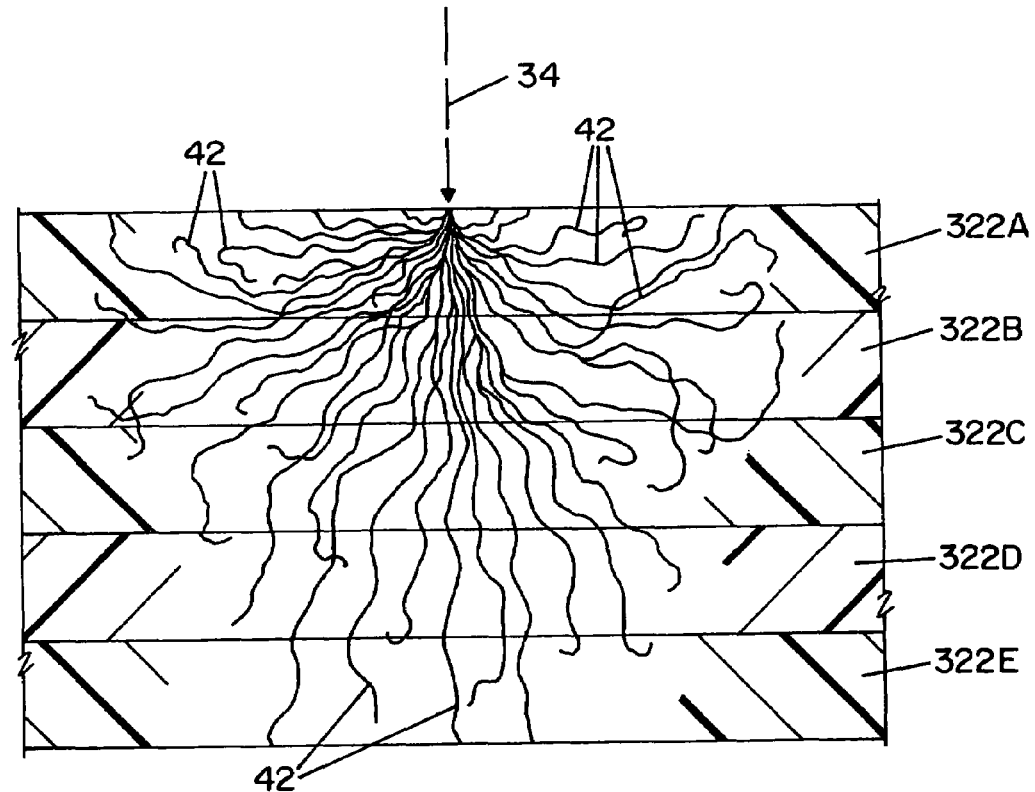
FIG. 6B is a sectional view taken along lines 6B—6B of FIG. 6, illustrating the trajectories of electrons from an electron beam in the multiple layers of polymeric sheets shown in FIG. 6.

Referring now to FIG. 6, a process line 300 for forming a plurality of microporous fluoropolymer sheets, simultaneously, is illustrated. (In FIG. 6, components that are the same as those shown in FIG. 1 are identified with like reference numbers). Process line 300 is similar to those heretofore described with the exception that instead of irradiating and etching a single fluoropolymer film 22 in process line 300, five (5) fluoropolymer films 322A, 322B, 322C, 322D and 322E are aligned and travel together past the irradiation source 32 and through the etching process to simultaneously provide a plurality of microporous fluoropolymer membranes. Opposed guide rollers 52 join films 322A, 322B, 322C, 322D and 322E together into a layered stack. FIG. 6A illustrates the respective layers of fluoropolymer films 322A, 322B, 322C, 322D and 322E being stacked for processing. FIG. 6B is an illustration depicting how a beam of electrons 34 travels through the plurality of fluoropolymer films 322A, 322B, 322C, 322D and 322E. As indicated above, during an actual irradiation process, electrons 34 would scan the entire surface of the assembled film layers, thereby producing a continuous web or pattern of trajectories 42 throughout the respective fluoropolymer films 322A, 322B, 322C, 322D and 322E. In this respect, the uppermost layer will have a larger number of tracks or trajectories therethrough as contrasted to layers therebelow. FIG. 6B schematically illustrates the different density of trajectories 42 in the respective films 322A, 322B, 322C, 322D and 322E. As illustrated in FIG. 6, the film layers 322A, 322B, 322C, 322D and 322E may be directed to separate etching tanks 62 containing etching solution 64. The concentration of etching solution 64 in respective tanks 62 is adjusted in light of the density of trajectories 42 in the respective films 322A, 322B, 322C, 322D and 322E, so as to result in a desired porosity for each of the respective films 322A, 322B, 322C, 322D and 322E. FIG. 6 thus illustrates how a plurality of fluoropolymer membranes can be simultaneously formed in accordance with the present invention.

Figure 8:
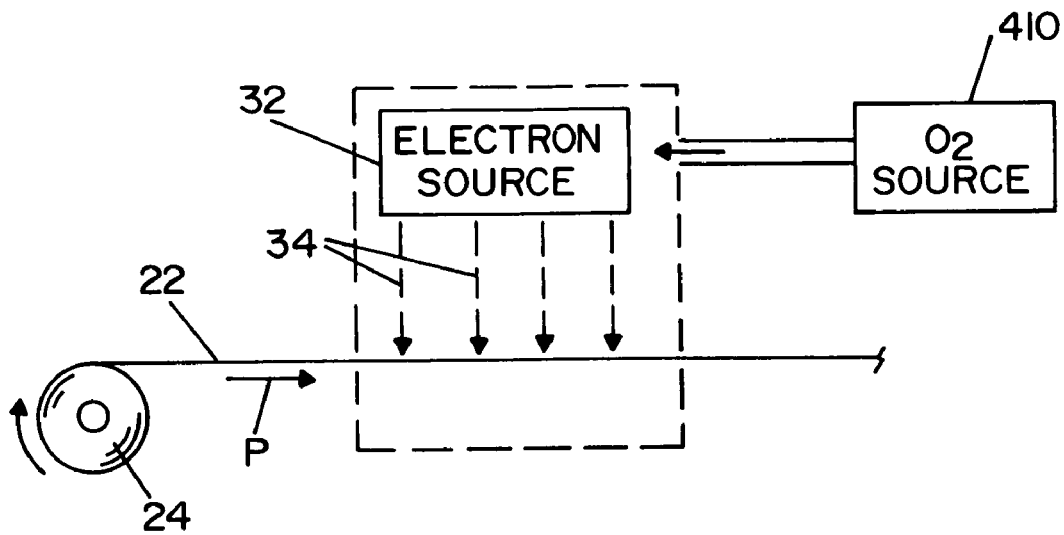
FIG. 8 is a schematic view of a process for irradiating a polymeric sheet, illustrating another embodiment of the present invention.

Referring now to FIG. 8, another embodiment of the present invention is illustrated. FIG. 8 shows an oxygen source 410 that provides an oxygen-bearing medium to the vicinity (area) where film 22 is irradiated by electrons 34 (or photons) from electron source 32. The oxygen-bearing medium may be a gas or liquid. In one embodiment, oxygen is provided in gaseous form to the area where film 22 is irradiated. In another embodiment, water is applied, i.e., sprayed, on film 22 in the area where film 22 is irradiated. The water breaks down producing molecular oxygen ($O_2$). The presence of oxygen ($O_2$) in the area where film 22 is irradiated promotes or enhances the breakdown or degradation of the polymer chains as a result of the oxidative effect of the oxygen on the polymer.

The effects of oxygen ($O_2$) on the polymeric film shall be further illustrated by the following Examples.

EXAMPLE V

A polytetrafluoroethylene (PTFE) film having a thickness of approximately 100 microns is irradiated in air with a layer of water on the surface of the film. The thickness of the layer of water is about 100 microns. The film is irradiated to receive an absorbed dose of about 5 kGy. The irradiated film is etched for 2 to 5 minutes in a sodium ammonia etchant. The resultant membrane has pores having average dimensions of between 0.2 and 10 microns.

EXAMPLE VI

A polytetrafluoroethylene (PTFE) film having a thickness of approximately 1 mm is irradiated in air with a layer of water on the surface of the film. The thickness of the layer of water is about 100 microns. The film is irradiated to receive an absorbed dose of about 5 kGy. The irradiated film is etched for 15 to 20 minutes in a sodium ammonia etchant. The resultant membrane has pores having average dimensions of between 0.5 and 20 microns.

EXAMPLE VII

A polytetrafluoroethylene (PTFE) film having a thickness of approximately 100 microns is irradiated in an oxygen-enriched environment. The film is irradiated to receive an absorbed dose of about 5 kGy. The irradiated film is etched for 2 to 5 minutes in a sodium ammonia etchant. The resultant membrane has pores having average dimensions of between 0.2 and 10 microns.

EXAMPLE VIII

A polytetrafluoroethylene (PTFE) film having a thickness of approximately 1 mm is irradiated in an oxygen-enriched environment. The film is irradiated to receive an absorbed dose of about 5 kGy. The irradiated film is etched for 12 to 18 minutes in a sodium ammonia etchant. The resultant membrane has pores having average dimensions of between 0.5 and 20 microns.

Contrasting the etching times of EXAMPLES V, VI, VII and VIII with those of EXAMPLES I and II, shows that the etching time for forming essentially the same porous membrane is less for polytetrafluoroethylene (PTFE) film irradiated in the presence of an oxygen-bearing medium. The reduced etching time to produce the same porous membrane is the result, it is believed, of the increased breakdown or degradation of the films in EXAMPLES V through VIII, due to the presence of oxygen. In this respect, the same absorbed dose of radiation produces greater degradation in the film in the presence of oxygen. The greater degradation of the polymer facilitates more rapid etching to produce the same pore sizes.

From the foregoing, those skilled in the art will appreciate that irradiating the polymeric film in the presence of oxygen may reduce the absorbed dose (energy) necessary to produce a desired porous membrane. In this respect, it was found that the dosage required to produce the desired degradation in the polytetrafluoroethylene (PTFE) film may be reduced by about 50% if the irradiation occurs in an oxygen-enriched environment.

Figure 9:
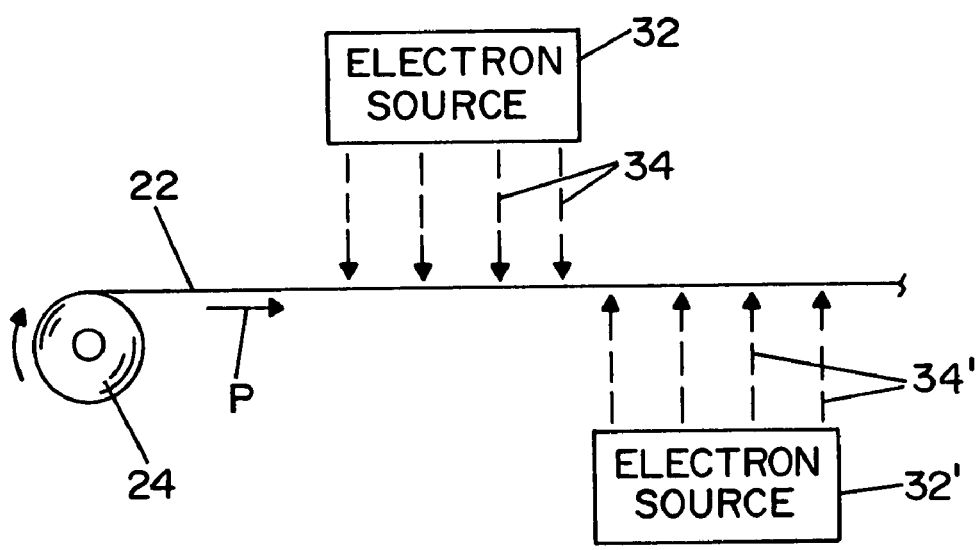
FIG. 9 is a schematic view of a process for irradiating a polymeric sheet, illustrating yet another embodiment of the present invention.
Figure 10:
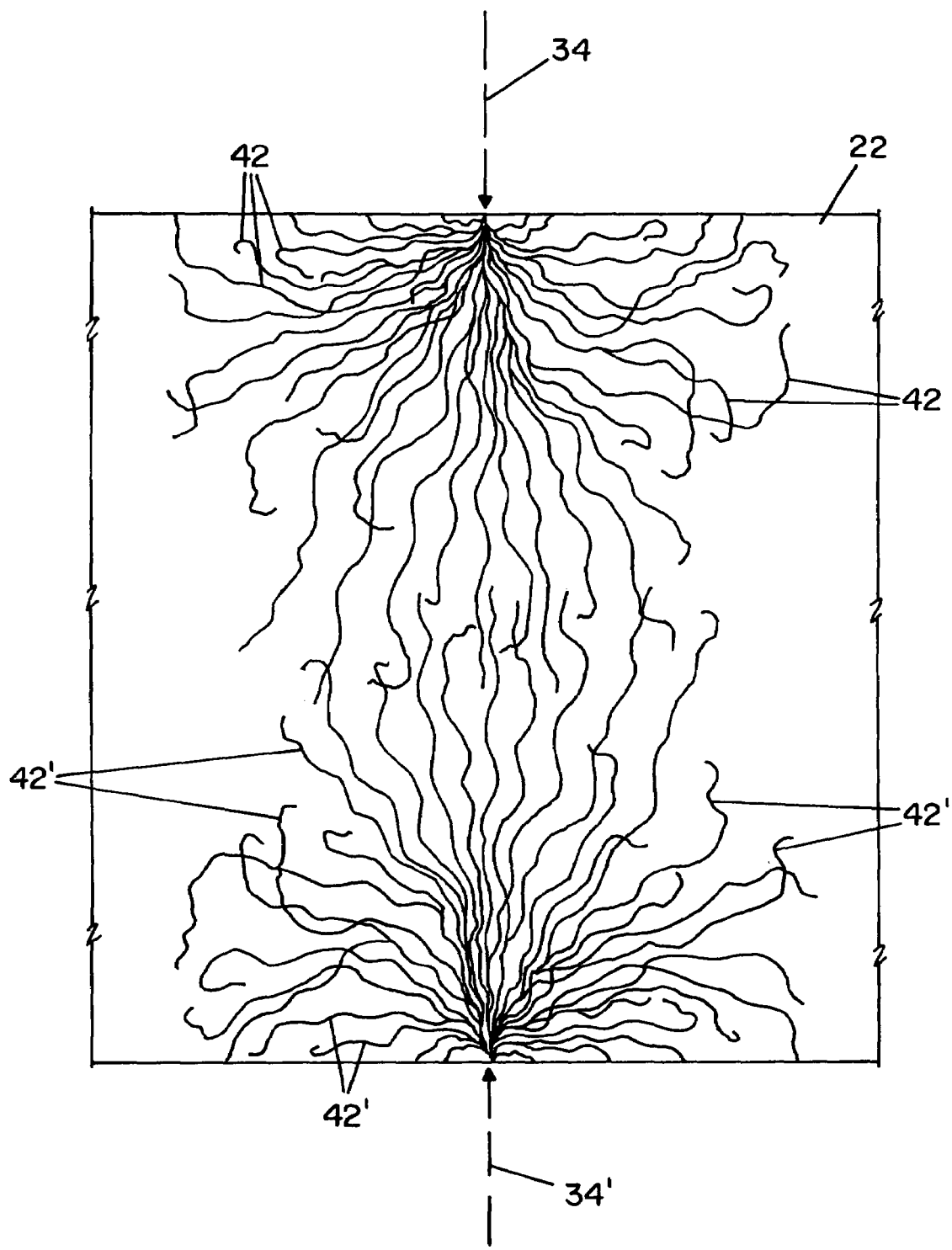
FIG. 10 is a schematic view representing the trajectories of electrons in a polymeric sheet irradiated from both sides.

The embodiments disclosed heretofore show a single irradiation source 32 irradiating one side of film 22. As illustrated in FIG. 9, it is contemplated that a second irradiation source 32', located on the opposite side of film 22, could be provided so that film 22 may be irradiated from both sides. Irradiating film 22 from both sides allows the formation of porous membranes having increased thickness. In this respect, as noted above, the depth of penetration of the electrons into a fluoropolymer film 22 is based upon the kinetic energy of the electrons. By irradiating both sides of film 22, electrons 34 (or photons) penetrate into the polymeric material from both sides. At or near the center of film 22, the trajectories or path 42, 42' of electrons 34, 34', respectively, cross and/or intersect, as schematically illustrated in FIG. 10. When etched, intersecting paths or trajectories 42, 42' form the pores through film 22. In this respect, it is contemplated that a microporous fluoropolymer sheet having a thickness up to about 30 mm may be formed by irradiating the sheet from both sides, and etching the sheet as indicated above.

It will also be appreciated that this method, i.e., irradiating two sides of a sheet, may also be used to form porous membranes from thin films, and that lower kinetic energy levels of the electrons (photons) may be required to irradiate the film since half the thickness of the film is penetrated by electrons or photons from each source of radiation.

The present invention thus provides methods of forming microporous fluoropolymer membranes that are suitable for use in the medical field in filtering viruses, bacteria and other toxic liquid and gases.

The foregoing description is a specific embodiment of the present invention. It should be appreciated that this embodiment is described for purposes of illustration only, and that numerous alterations and modifications may be practiced by those skilled in the art without departing from the spirit and scope of the invention. For example, although the present invention has been described with respect to a continuous process for a generally continuous moving film, it is contemplated that individual pieces of films, plates or other shapes of fluoropolymer material could be processed individually. Still further, although the present invention has been described with respect to a fluoropolymer material, it is contemplated that other polymers may be formed into porous material in accordance with the present invention. It is intended that all such modifications and alterations be included insofar as they come within the scope of the invention as claimed or the equivalents thereof.

Having described the invention, the following is claimed:

1. A method of forming a microporous fluoropolymer sheet, comprising the steps of:
    irradiating a sheet of fluoropolymer at a dosage level below the rupture energy of the carbon-to-fluorine (C—F) bonds of the fluoropolymer, but sufficient to rupture carbon-to-carbon (C—C) bonds by moving said sheet of fluoropolymer past a stationary source of electrons, wherein said source of electrons is comprised of a target material exposed to x-rays; and
    exposing the sheet of fluoropolymer to an etchant for a period of time sufficient to etch away disrupted atoms and molecules, wherein continuous micropassages are formed through said sheet.

2. A method of forming a microporous fluoropolymer sheet, comprising the steps of:
    irradiating a sheet of fluoropolymer at a dosage level below the rupture energy of the carbon-to-fluorine (C—F) bonds of the fluoropolymer, but sufficient to rupture carbon-to-carbon (C—C) bonds by moving said sheet of fluoropolymer past a stationary source of electrons, wherein said source of irradiation is an isotope; and exposing the sheet of fluoropolymer to an etchant for a period of time sufficient to etch away disrupted atoms and molecules, wherein continuous micropassages are formed through said sheet.

3. A method as defined in claims 1 or 2, wherein said dosage level is between 5 kGy and 20 kGy.

4. A method as defined in claim 3, wherein said etchant is a liquid.

5. A method as defined in claim 4, wherein said etchant is selected from the group consisting of sodium, ethylene glycol dimethyl ether (MONOGLYME), diethylene glycol dimethyl ether (DIGLYME) or tetraethylene glycol dimethyl ether (TETRAGLYME).

6. A method of forming a microporous fluoropolymer sheet, comprising the steps of:
    irradiating a sheet of fluoropolymer at a dosage level below the rupture energy of the carbon-to-fluorine (C—F) bonds of the fluoropolymer, but sufficient to rupture carbon-to-carbon (C—C) bonds; and
    exposing the sheet of fluoropolymer to an etchant for a period of time sufficient to etch away disrupted atoms and molecules, wherein continuous micropassages are formed through said sheet, and wherein said etchant is fluorine gas.

7. A method of forming a microporous fluoropolymer sheet, comprising the steps of:
    irradiating a sheet of fluoropolymer at a dosage level below the rupture energy of the carbon-to-fluorine (C—F) bonds of the fluoropolymer, but sufficient to rupture carbon-to-carbon (C—C) bonds; and
    exposing the sheet of fluoropolymer to an etchant for a period of time sufficient to etch away disrupted atoms and molecules, wherein continuous micropassages are formed through said sheet, and wherein said sheet of fluoropolymer is one of several sheets simultaneously exposed to said electrons, and wherein said several sheets of fluoropolymer are layered one on another into a stack and said electrons radiate through said stack.

8. A method of forming a microporous fluoropolymer sheet, comprising the steps of:
    irradiating a sheet of fluoropolymer at a dosage level below the rupture energy of the carbon-to-fluorine (C—F) bonds of the fluoropolymer, but sufficient to rupture carbon-to-carbon (C—C) bonds; and
    exposing the sheet of fluoropolymer to an etchant for a period of time sufficient to etch away disrupted atoms and molecules, wherein continuous micropassages are formed through said sheet, and wherein said irradiated fluoropolymer sheet is etched in a liquid etchant within an electric field that produce an electrophoresis effect in said liquid etchant.

9. A method as defined in claims 1, 6, 7 or 8, wherein said fluoropolymer is polytetrafluoroethylene (PTFE).

10. A method of forming a microporous fluoropolymer sheet, comprising the steps of:
    irradiating a sheet of fluoropolymer at a dosage level below the rupture energy of the carbon-to-fluorine (C—F) bonds of the fluoropolymer, but sufficient to rupture carbon-to-carbon (C—C) bonds; and
    exposing the sheet of fluoropolymer to an etchant for a period of time sufficient to etch away disrupted atoms and molecules, wherein continuous micropassages are formed through said sheet, and wherein said step of irradiating occurs with an oxygen-bearing medium supplied to an area where said fluoropolymer sheet is irradiated.

11. A method as defined in claim 10, wherein said oxygen-bearing medium is a fluid.

12. A method as defined in claim 11, wherein said oxygen-bearing medium is water.

13. A method as defined in claim 12, wherein said water is sprayed onto said fluoropolymer sheet.

14. A method as defined in claim 10, wherein said oxygen-bearing medium is a gas.

15. A method as defined in claim 14, wherein said gas is oxygen.

16. A method as defined in claim 10, wherein said fluoropolymer is polytetrafluoroethylene (PTFE).

17. A method as defined in claim 7, wherein said sheet is a generally continuous film having a thickness between about 10 $\mu$m (microns) and 200 $\mu$m (microns), and said film is continuously conveyed past a stationary source of irradiation.

18. A method as defined in claim 17, wherein said film is conveyed through an etchant following said irradiation step.

19. A method as defined in claim 7, wherein said sheet has a thickness of about 10 $\mu$m (microns) to about 15 mm, and said sheet is irradiated and etched as an individual piece.

* * * * *